United States Patent Office 3,001,970

Patented Sept. 26, 1961

3,001,970

STABILIZATION OF POLYMERS OF VINYLIDENE CHLORIDE

Friedrich Ebel, Mannheim-Feudenheim, and Karl Burger and Karl Herrle, Ludwigshafen (Rhine), Germany, assignors to Badische Anilin- & Soda-Fabrik Aktiengesellschaft, Ludwigshafen (Rhine), Germany No Drawing. Filed Apr. 20, 1956, Ser. No. 579,453
Claims priority, application Germany Apr. 27, 1955
6 Claims. (Cl. 260—45.95)

This invention relates to mixtures of a polymer of vinylidene chloride and a stabilizer and a process for the production of such mixtures.

Homopolymers and copolymers of vinylidene chloride, under the action of light, undergo a decomposition as a result of which they become discolored brown. This brown coloration is stronger the higher the content of vinylidene chloride in the polymer concerned. It is very undesirable and in many cases precludes the practical use of the polymers.

The object of the present invention is a process for improving the stability to light of polymers of vinylidene chloride. Another object of the invention is a mixture of a vinylidene chloride polymer and a special stabilizing agent.

Other objects and advantages of the invention may be seen from the following more detailed description of the invention.

In accordance with this invention it has been found that the discoloration of polymers of vinylidene chloride in light can be extensively prevented by adding thereto a small amount of a dibenzoylmethane of the general formula:

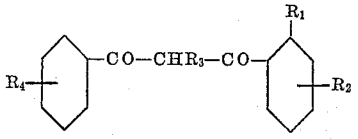

in which $R_1$ represents hydrogen or a hydroxyl radical, and $R_2$, $R_3$ and $R_4$ represent hydrogen or hydrophobic radicals. Such hydrophobic radicals are for example alkyl, cycloalkyl, aryl, aralkyl and halogen radicals.

Derivatives of dibenzoylmethane, besides dibenzoylmethane itself, which are especially suitable as stabilizers are for example ortho-hydroxy-dibenzoylmethane, 2-hydroxy-5-chlor-dibenzoylmethane and 2-hydroxy-5-methyldibenzoylmethane.

The said dibenzoylmethanes have a good compatibility with polymers and copolymers of vinylidene chloride. They effect a considerable improvement in the stability to light and moreover have a certain softening action when they are added in large amounts. As compared with other stabilizing agents, the dibenzoylmethanes according to this invention have an increased activity and an excellent compatibility with the vinylidene chloride polymers.

The amount thereof which is necessary depends on the content of vinylidene chloride in the polymer to be stabilized and on the nature and amount of the other components of copolymers. In general the optimum amount lies between 0.1 and 5%, but it may also be more or less, as for example 0.01 to 10%, with reference to the weight of the vinylidene polymer.

The addition of the dibenzoylmethane derivatives can be effected in various ways. If the polymer is present as a solution, they can be dissolved in this solution while stirring. In the case of polymer dispersions, it is preferable first to prepare an aqueous suspension of the stabilizer while using the usual emulsifiers, if desired with the co-employment of organic solvents. To solid products the stabilizer can be added in powdered form or as a solution in the usual softeners or solvents.

The said stabilizers are active with all polymers and copolymers of vinylidene chloride. There come into question in particular copolymers of vinylidene chloride with vinyl chloride, but also polyvinylidene chloride and copolymers of vinylidene chloride with other monomeric olefinic compounds, having a terminal methylene group, such as esters, amides and nitriles of unsaturated carboxylic acids, as for example acrylic acid methyl ester, acrylic acid butyl ester, methacrylic acid methyl ester, acrylamide, methacrylamide, acrylonitrile, methacrylonitrile; vinyl esters, as for example vinyl acetate or vinyl propionate; vinyl ethers, as for example vinyl methyl ether and vinyl isobutyl ether, and unsaturated ketones, as for example methyl vinyl ketone. These polymers should preferably contain at least 5%, but advantageously at least 30%, of vinylidene chloride. The stabilizers according to this invention are also of interest for the stabilization of copolymers for the preparation of which two or more monomers have been used besides vinylidene chloride.

The stabilized vinylidene chloride polymers according to this invention may be used in all the fields in which other vinylidene chloride polymers are used, as for example for the production of shaped articles, coatings, lacquers, films and the like.

Whereas the polymers of vinylidene chloride without the addition of these stabilizers discolor in light within a short time and then assume a dark brown to black color, the polymers to which the new stabilizers have been added discolor only to a very small extent and then only after a considerably longer time.

The following examples will further illustrate this invention but the invention is not restricted to these examples. The parts specified are parts by weight.

*Example 1*

A solution of 0.2 part of 2-hydroxydibenzoylmethane in 10 parts of di-ethyl-hexyl-phthalate is added to 90 parts of a copolymer of about 85% of vinylidene chloride and 15 parts of vinyl chloride and the mixture is then homogenized in a ball mill for 12 hours. A mixture of the copolymer with di-ethyl-hexyl-phthalate, free from stabilizer, is prepared in the same way.

Plates 1 millimeter thick are pressed from both mixtures at 180° C.

The pressed plate prepared from the mixture containing stabilizer is colored only quite slightly yellowish. By storage for one hour at 160° C. there is trivial discoloration without the occurrence of bubbles.

On the contrary the pressed plate prepared from the mixture free from stabilizer is colored clearly brown. When stored at elevated temperature, the discoloration intensifies and at the same time numerous bubbles form.

The pressed plates are exposed to sunlight for four weeks. The plate containing stabilizer is scarcely discolored at all, whereas the plate free from stabilizer becomes dark brown in color.

Practically the same result is achieved by using 0.1% of 2-hydroxy-5-methyl-dibenzoylmethane instead of 0.2% of 2-hydroxydibenzoylmethane.

*Example 2*

1 part of dibenzoylmethane which has been finely dispersed in 10 parts of a dilute soap solution by intense stirring is added to 100 parts of a 50% aqueous dispersion of a copolymer of 60 parts of vinylidine chloride and 40 parts of vinyl chloride. The dispersion is then kept at 50° C. for an hour while stirring.

By drying out at about 50° C., the dispersion leaves behind an almost clear, colorless film which is scarcely discolor at all after 14 days storage in sunlight. The same result is also obtained by using ditoluylmethane as stabilizer instead of dibenzoylmethane.

A film prepared in the same way but without the addition of stabilizer becomes discolored brown in a few days when exposed to sunlight in the same way.

*Example 3*

To a 40% aqueous dispersion of a copolymer of 90 parts of vinylidene chloride and 10 parts of methyl acrylate there is added as described in Example 2, 0.2 part of 2-hydroxy-5-chlor-dibenzoylmethane for each 100 parts of polymer.

By brushing the dispersion onto paper, a coating about 20 microns thick is prepared. When this coated paper is exposed to sunlight, the coating only becomes slightly discolored within 14 days, whereas a coating prepared without stabilizer becomes dark brown in color in half the time.

*Example 4*

0.5% of 2-hydroxydibenzoylmethane (with reference to the polymer) is added to a 50% solution of a copolymer of 40 parts of vinylidene chloride and 60 parts of vinyl chloride.

Films prepared from the solution by drying it exhibit only quite a slight discoloration after 4 weeks in sunlight whereas film prepared without stabilizer but otherwise under the same conditions becomes strongly brown.

*Example 5*

To a 50% aqueous emulsion of a copolymer of 80 parts of vinylidene chloride and 20 parts of butyl acrylate there is added, as described in Example 2, 0.1 part of 2-hydroxy-5-methyldibenzoylmethane with reference to the polymer. If this emulsion is allowed to dry in a thin layer on glass, a clear colorless film is obtained which hardly changes at all upon irradiation for 4 weeks in sunlight. A corresponding film prepared without stabilizer becomes discolored fairly dark brown in the same time. In the same way and with the same result, an emulsion of a copolymer of 80 parts of vinylidene chloride and 20 parts of vinyl acetate can be stabilized.

*Example 6*

An emulsion which has been obtained by dissolving 0.1 part of 2-hydroxydibenzoylmethane in 10 parts of ethyl acetate and emulsifying this solution in 10 parts of dilute soap solution is added to 100 parts of a 50% emulsion of a copolymer of 80 parts of vinylidine chloride, 10 parts of vinyl chloride and 10 parts of vinyl acetate. By drying out the emulsion there is obtained a clear, almost colorless film which has hardly discolored at all after storage for 14 days in sunlight. A film prepared from the same emulsion but without the stabilizer discolors dark brown under the same conditions.

A 50% emulsion of a copolymer of 70 parts of vinylidene chloride, 20 parts of vinyl chloride and 10 parts of methyl methacrylate can be stabilized in the same way. The film prepared from this emulsion is similarly substantially stable to sunlight, while the film prepared under the same conditions from the unstabilized emulsion becomes strongly discolored.

*Example 7*

0.05 part of 2-hydroxy-5-methyl-dibenzoylmethane, with reference to the polymer, is dissolved in a 20% solution of a copolymer of 85 parts of vinylidene chloride and 15 parts of acrylonitrile in methyl ethyl ketone. Upon drying in a thin layer, the solution yields a clear, colorless film which does not change upon storage for 14 days in sunlight. A corresponding film but free from stabilizer becomes brown in color under the same conditions.

*Example 8*

A brushable paste is prepared by intense mixing of 40 parts of a copolymer of 95 parts of vinylidene chloride and 5 parts of vinyl chloride with 0.12 part of 2-hydroxydibenzoylmethane in 60 parts of cyclohexanone. A thin coating of this paste on glass yields by heating for half an hour at 130° C. an almost clear and colorless film which does not discolor upon lying for 14 days in sunlight. A film prepared in the same way but without the stabilizer is brownish and becomes much darker with the same irradiation.

We claim:

1. A composition of matter containing a polymer of 40% to 100% vinylidene chloride and 60% to 0% of at least one other monomeric olefinic compound having a terminal methylene group and, as a light stabilizer, a 2-hydroxy-dibenzoylmethane of the general formula

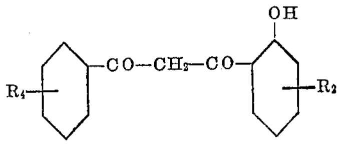

in which $R_2$ and $R_4$ are members of the group consisting of hydrogen, methyl and chlorine; said stabilizer being present in an amount of 0.01 to 5% with reference to the weight of the vinylidene chloride polymer.

2. A composition of matter as claimed in claim 1 wherein the stabilizer is present in an amount of 0.1 to 5% with reference to the total weight of said polymer.

3. A composition of matter as claimed in claim 1 in which said polymer is a copolymer of vinylidene chloride and vinyl chloride.

4. A composition of matter as claimed in claim 1 in which the stabilizer is 2-hydroxy-dibenzoylmethane.

5. A composition of matter as claimed in claim 1 which contains 2-hydroxy-5-chlorodibenzoylmethane as the stabilizer.

6. A composition of matter as claimed in claim 1 which contains 2-hydroxy-5-methyldibenzoylmethane as the stabilizer.

References Cited in the file of this patent

UNITED STATES PATENTS

| | | |
|---|---|---|
| 2,394,689 | Heyman | Feb. 12, 1946 |
| 2,434,496 | Houtman | Jan. 13, 1948 |
| 2,530,273 | Van Hook et al. | Nov. 14, 1950 |
| 2,552,328 | Kropa | May 8, 1951 |
| 2,601,255 | Bruson | June 24, 1952 |
| 2,807,604 | Gordon | Sept. 24, 1957 |